United States Patent [19]

Dekker et al.

[11] Patent Number: 4,672,512
[45] Date of Patent: Jun. 9, 1987

[54] SOLID ELECTROLYTIC CAPACITOR

[75] Inventors: Albert Dekker; Evert H. L. J. Dekker, both of Zwolle, Netherlands

[73] Assignee: U.S. Philips Corporation, New York, N.Y.

[21] Appl. No.: 867,180

[22] Filed: May 27, 1986

[30] Foreign Application Priority Data

Jun. 3, 1985 [NL] Netherlands .................... 8501584

[51] Int. Cl.⁴ .............................................. H01G 9/00
[52] U.S. Cl. ................................................... 361/433
[58] Field of Search ............... 361/306, 308, 309, 310, 361/433 A, 433 C, 433 S

[56] References Cited

U.S. PATENT DOCUMENTS 2,936,514  5/1960  Millard ...................... 361/433 S X

FOREIGN PATENT DOCUMENTS 2077997 12/1981 United Kingdom ............ 361/433 C

OTHER PUBLICATIONS

I.B.M. Technical Disclosure Bulletin, vol. 9, No. 11, Apr. 1967, p. 1562.

Primary Examiner—Donald A. Griffin
Attorney, Agent, or Firm—Norman N. Spain

[57] ABSTRACT

During operation of a solid electrolytic capacitor having manganese dioxide as a semiconductor compound, the impedance and the loss factor increase whereas the capacitance decreases. This can be attributed to a dissociation of the manganese dioxide, in which process oxygen is released which attacks the housing. This is obviated by introducing $MnO_2$ powder in the housing, either in loose form or, preferably, by dispersing finely distributed manganese-dioxide powder in the material of the housing.

4 Claims, 3 Drawing Figures

SOLID ELECTROLYTIC CAPACITOR

BACKGROUND OF THE INVENTION

The invention relates to a solid electrolytic capacitor having manganese dioxide as a semiconductor compound and an anode body formed of a film-forming metal which is provided with a dielectric oxide film by means of anodic oxidation.

Manganese dioxide is obtained by moistening the oxidized anode body or by impregnating it with a solution of a maganese salt which after heating is converted into manganese dioxide by pyrolysis.

The shape of the cathode depends on the specific embodiment of the capacitor. In a solid tantalum capacitor having a porous sintered anode or a capacitor having an anode which is punched from aluminum sheet, etched and folded, the cathode comprises a multiple layer of graphite, silver and tin, which is deposited on the formed, impregnated and pyrolysed anode body. In a solid aluminum foil capacitor, the cathode comprises an etched aluminum foil which is wound up together with at least two separator foils.

The capacitor is incorporated in a housing of an electrically insulating material, comprising, for example, silicone resin, epoxy resin, polystyrene or polyester.

Impedance Z at 100 kHz and the loss factor (tan δ) of these capacitors generally increase during operation at elevated temperatures and for an extended period of time while the capacitance decreases.

In a life test which is carried out at 125° C., the requirement is for the increase of Z and tan δ to be less than 20% after 2000 hours.

It is assumed that the increase of the impedance Z and of tan δ is caused by an dissociation of $MnO_2$ at a elevated temperature, thereby releasing oxygen. Subsequently, the this oxygen reacts with the material of the housing which is gradually decomposed. Thus, the dissociation of the manganese dioxide becomes irreversible, the lower manganese oxides being responsible for a decrease in conduction.

GB-PS No. 885,965 which relates to a solid electrolytic capacitor as referred to in the opening paragraph, describes the above-mentioned properties of such a capacitor during use at high temperatures. A decrease of capacitance and increase of leakage current can be reduced in accordance with this publication by introducing oxygen or an oxygen-furnishing substance in the hermetically sealed housing. Silver peroxide, barium peroxide or perchlorates are listed as the sources for the oxygen-furnishing compound.

However, from a view-point of industrial manufacture, there are some inconveniences attached to the introduction of oxygen or an oxygen-furnishing substance. Moreover, the introduction of substances which are alien to the capacitor and which are rather agressive should be avoided in order not to reduce the electrical properties of the capacitor.

BRIEF SUMMARY OF THE INVENTION

In accordance with the invention, the oxygen-furnishing substance which is introduced in the housing of the capacitor is powdery manganese-dioxide.

The manganese-dioxide powder can be introduced in the housing in loose form. It is to be preferred, however, that the manganese-dioxide powder is finely dispersed in the material of the housing.

The manganese-dioxide powder to be used may in analogy with the manganese-dioxide in the anode body be obtained by pyrolysis of a manganese compound.

Electrolytic manganese dioxide is, however, substantially more reactive and thus more effective within the framework of the invention. Therefore, this type of manganese dioxide is clearly to be preferred.

Electrolytic manganese dioxide is obtained by electrolysing a manganese (II) salt solution, for example a solution of manganese (II) sulphate in which $MnO_2$ is deposited on the anode and hydrogen escapes from the cathode.

DETAILED DESCRIPTION OF THE INVENTION

Pyrolysed cells of a solid aluminum capacitor having an anode which is punched from aluminum sheet, etched and folded and having a capacitance of 6.8 /μF and an operating voltage of 25 V are enclosed by a coating of an epoxy formaldehyde resin which is cured by heating at 160° C.

By way of reference, a number of cells is enclosed as described above and introduced in a synthetic resin housing which is filled with an epoxy resin based on diglycidylether of bisphenol A. In a second series, the cells are coated with a suspension of the same epoxyformaldehyde resin supplemented with 20% of an electrolytic manganese-dioxide power which has an average particle size of 50 /μm, the cells are cured at 160° C. and finished in accordance with the embodiment of reference.

Figure 1:
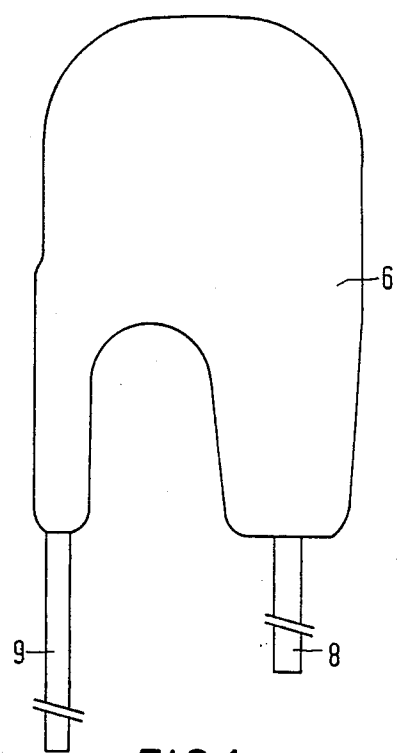
FIGS. 1 and 2 are a front view and a side view respectively of a solid provided capacitor with an aluminum anode-body.
Figure 2:
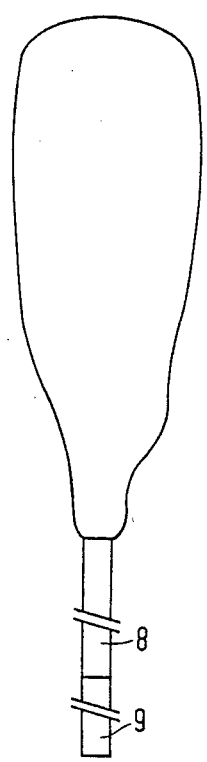

FIGS. 1 and 2 show a front view and a side view respectively of a solid capacitor with a folded aluminum plate anode body with anode-wire 8 and cathode wire 9.

Figure 3:
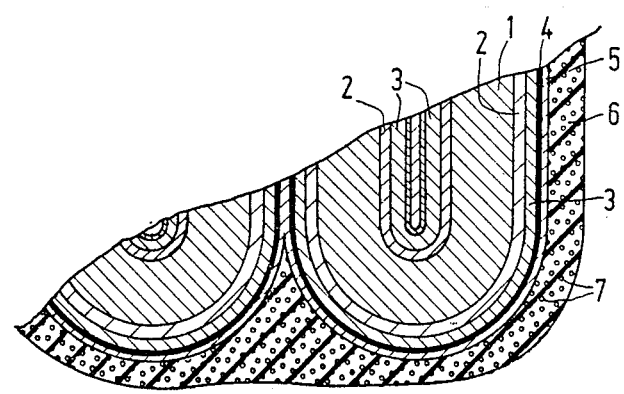
FIG. 3 is a sectional view at an increased scale of a solid capacitor according to the invention.

FIG. 3 represents a sectional view at an increased scale of the capacitor according to the second embodiment described above.

In the embodiment shown in FIG. 9, both sides of plate 1 consisting of aluminium bear a dielectric oxide layer 2, the semiconductive manganese dioxide layer 3, a graphite layer 4 and a silver layer 5. All enclosed in an envelope of insulating material 6 in which manganese particles 7 dispersed throughout.

The Table below lists the outcome of a storage test carried out at 125° C., in which after different time intervals the values are measured of the capacitance (in /μF), of the loss factor tan δ, both at 100 Hz, and of impedance Z at 100 kHz (in Ohms).

TABLE

| Storage test at 125° C. of 6.8 μF/25 V capacitors. | | | | | |
|---|---|---|---|---|---|
| Coating without $MnO_2$ (reference) | | | Coating with $MnO_2$ (invention) | | |
| t (hours) | cap (μF) | tan δ | $Z_{100\,kHz}$ (Ohm) | cap (μF) | tan δ | $Z_{100\,kHz}$ (Ohm) |
| 0 | 7,0 | 0,047 | 1,05 | 7,3 | 0,032 | 0,732 |
| 68 | 6,7 | 0,044 | 1,15 | 7,1 | 0,028 | 0,726 |
| 140 | 6,6 | 0,048 | 1,19 | 7,0 | 0,031 | 0,733 |
| 236 | 6,6 | 0,051 | 1,21 | 7,0 | 0,031 | 0,729 |
| 336 | 6,5 | 0,052 | 1,23 | 7,0 | 0,028 | 0,726 |
| 571 | 6,4 | 0,058 | 1,28 | 6,9 | 0,033 | 0,733 |

TABLE-continued

Storage test at 125° C. of 6.8 μF/25 V capacitors.

| | Coating without MnO₂ (reference) | | | Coating with MnO₂ (invention) | | |
|---|---|---|---|---|---|---|
| t (hours) | cap (μF) | tan δ | $Z_{100\,kHz}$ (Ohm) | cap (μF) | tan δ | $Z_{100\,kHz}$ (Ohm) |
| 735 | 6,4 | 0,057 | 1,27 | 7,0 | 0,029 | 0,728 |
| 1000 | 6,5 | 0,058 | 1,27 | 7,0 | 0,033 | 0,726 |
| 1622 | 6,4 | 0,056 | 1,24 | 6,9 | 0,032 | 0,725 |

What is claimed is:

1. A solid electrolytic capacitor comprising a manganese dioxide as a semiconductor compound, an electrically insulating housing and an anode body of a film-forming metal, which body is provided with a dielectric oxide film by means of anodic oxidation and said semiconductor compound, an oxygen-furnishing substance being present in the capacitor, characterized in that the said oxygen-furnishing substance is powdery manganese dioxide positioned away from said anode body.

2. A solid electrolytic capacitor comprising manganese dioxide as a semiconductor compound, an electrically insulating housing and an anode body of a film-forming metal, which body is provided with a dielectric oxide film by means of anodic oxidation and said semiconductor compound, an oxygen-furnishing substance being present in the capacitor, characterized in that said oxygen-furnishing substance is powdery manganese dioxide finely dispersed in the material of said housing.

3. A capacitor as claimed in claim 1 characterized in that electrolytic manganese dioxide is used.

4. A capacitor as claimed in claim 2 characterized in that electrolytic manganese dioxide is used.

* * * * *